No. 840,534. PATENTED JAN. 8, 1907.
S. J. WEBB.
BALING PRESS.
APPLICATION FILED JAN. 16, 1900.

Witnesses
J. G. Hinkel
Alia Gillman

Inventor
Samuel J. Webb
by Foster Freeman
Attorneys

UNITED STATES PATENT OFFICE.

SAMUEL J. WEBB, OF MINDEN, LOUISIANA.

BALING-PRESS.

No. 840,534.   Specification of Letters Patent.   Patented Jan. 8, 1907.

Application filed January 16, 1900. Serial No. 1,630.

*To all whom it may concern:*

Be it known that I, SAMUEL J. WEBB, a citizen of the United States, residing at Minden, in the parish of Webster and State of Louisiana, have invented certain new and useful Improvements in Baling-Presses, of which the following is a specification.

My invention relates to baling-presses, and has for its object to provide a simple, cheap, and effective press whereby the material can be subjected to the required pressure and readily secured in bales; and it consists in the various features of construction and arrangement of parts, operating substantially in the manner hereinafter more particularly set forth.

Figure 1:
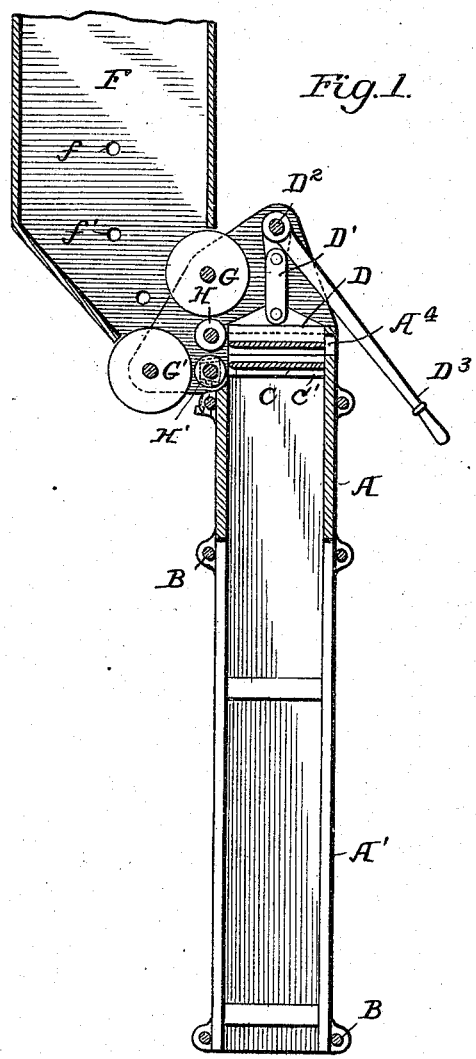
Figure 2:
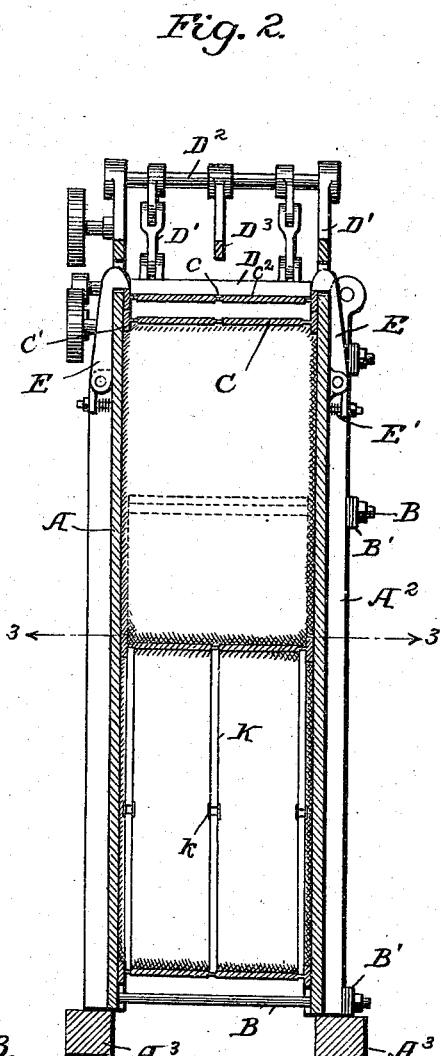
Figure 3:
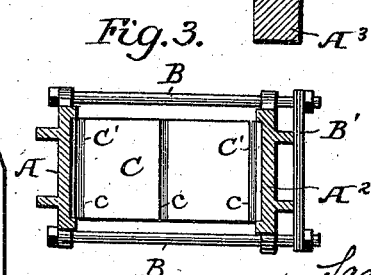
Figure 4:
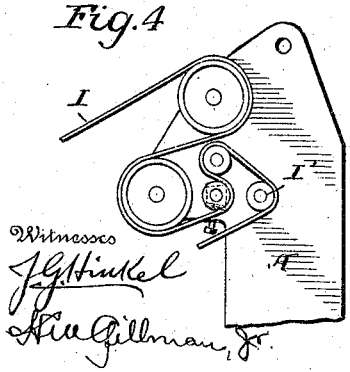

Referring to the accompanying drawings, Figure 1 is a vertical sectional view at right angles to Fig. 2. Fig. 2 is a similar vertical section of the device at right angles to Fig. 1, the hopper and compressing-rollers being omitted for the sake of clearness. Fig. 3 is a transverse sectional view on the line 3 3, Fig. 2; and Fig. 4 is a detail view showing one means of operating the rollers.

While my invention is intended more especially for baling cotton, it can be used, of course, for baling other material, and the details of construction and arrangement may be varied to adapt the invention for the particular purpose intended. In describing my invention I will refer to its use in baling cotton.

One of the distinguishing features of my invention is found in the fact that the bale is compressed in what is generally known as a "longitudinal" direction, or in the direction of its length instead of in the direction of its thickness or width. In accomplishing this the material—as, for instance, the cotton to form the bale—is delivered to the press in a continuous stream, and the baling of the cotton goes on continuously and progressively, and in this way a more compact or dense bale can be produced with a given power than if the bale were compressed as a whole. I may remark at this point that while it is deemed preferable to compress the bale in the direction of its length my invention may be used for compressing it in other directions, the form of the box and other appliances being properly shaped for this purpose.

In baling cotton it is generally preferable to locate the baling-press adjacent to the gin, so that the ginned cotton is delivered directly and continuously to the press.

Referring now to the drawings, the press-body consists of what I have termed a "box" portion A, which receives the cotton, and this box portion is extended to form what may be termed the "tying" portion A'. This box A may be made of any suitable material, preferably of metal, and it is provided with one adjustable side, as $A^2$, and it may be provided with any suitable means for adjusting the side, and I have shown in the present instance a series of bolts B passing through lugs on the sides of the box and connected at one end to springs B', which are shown in the form of leaf-springs, through the ends of which the bolts pass and are tightened by suitable nuts or other means. The purpose of this adjustable side is to produce a certain amount of friction on the separating-plates and the cotton or other material being baled, as more particularly hereinafter described. The tying portion of the press is open at two sides below the box portion to permit ready access to the bale for the purpose of tying the same. The whole press may be mounted on suitable supports or a platform having an opening through which the bale can be passed, as indicated by the beams or blocks $A^3$.

In using the press I provide a series of separating or division plates C. These plates are preferably provided at their edges with flanges C', which form guides for the plates to keep the plates from turning in the box and also serve to properly space them at the beginning of the operation to provide an initial space to receive the cotton or other material. The plates are also provided with grooves $c$ on their opposite faces for the passage of the tie-bands.

In order to supply the plates to the press, one side of the box is preferably cut away, as indicated at $A^4$, and in order to form an abutment for the upper plate, beneath which the cotton is being supplied, I provide some suitable apparatus, shown in the present instance in the form of a platen D, which is connected by a toggle-joint D' with a shaft $D^2$, having a suitable operating device, as the handle $D^3$. The purpose of this device is not only to form an abutment, but also to aid in placing a plate in proper position in the manner hereinafter set forth. The sides of the box are also provided with suitable means to hold the upper plate in position, as the hooks E, which are shown as pivoted to flanges or ribs on the box side, and these are preferably provided with spring devices E', which hold the hooks normally in the position shown in Fig. 2.

Arranged adjacent to or connected with the box is a suitable hopper F for receiving the continuous bat as it comes from the gin, and this hopper may be provided with a series of openings $ff'$, through which a tool can be passed to stir up the cotton if, perchance, it gets clogged or massed in such a way as to interfere with the operation of the press.

The bat of cotton from the hopper is pressed or condensed progressively as it passes to the baling-box and is forced into the same between a pair of plates, and in order to do this I have shown a series of presser-rollers arranged in the present instance on an extension of the box. These comprise the primary pressing-rollers G G' and the final pressure or delivery rollers H H'. These rollers are suitably geared, so as to have proper surface speed, and are preferably arranged substantially in the relation indicated in Figs. 1 and 4, and it will be seen that the roller H' is mounted in adjustable bearings, so that the final pressure on the bat can be adjusted. It is evident that the relations of the other rollers to each other can be adjusted, if desired; but it is not deemed necessary to show the specific means for accomplishing this result, as in ordinary practice it is sufficient to have the final pressure-rollers adjustable. It will be seen that the bat from the hopper F first passes between the rollers G G' and is condensed and compressed, and thence passing between the rollers H and G' is further condensed and compressed, and finally passing between the rollers H and H' it receives its final pressure and condensation and is forced into the box between two plates.

Suitable means must be provided for driving the rollers, and while these may vary I have shown in Fig. 4 a belt I, arranged to drive all the rollers, so that they will have a practically uniform surface speed and at the same time permit of their relative adjustment, and I have shown an idler I' for directing the belt, so that it can be attached to the source of power. (Not shown.)

Such being the general construction of the baling-press, its operation will now be set forth.

In starting the press two plates, as C and $C^2$, are placed in the position shown in the drawings, and the hooks E engage the flanges of the upper plate, and the toggle is straightened, so as to form an additional abutment for the center of the upper plate $C^2$. It will be understood that the side $A^2$ is adjusted by means of the bolts B and the springs B', so that there will be considerable friction on the plates—sufficient, for instance, to maintain plate C in the position shown and to offer the necessary resistance to its downward movement in order to insure the proper condensation of the bale. The bat being now supplied to the hopper F and the rollers being set in motion, the bat is successively condensed between the rollers, and as it leaves the final pressure-rollers H H' it is forced in between the plates C $C^2$ under great pressure. Not only are the fibers of the bat pressed together in such a way as to practically exclude all air and make the bat exceedingly dense, but the forcing of the condensed bat between the plates C $C^2$ adds to the condensation or density. As the cotton is forced between the plates under this pressure the friction on the lower plate is overcome, and the plate is gradually forced downward as the bale is built up, and of course after the bale has been started the friction of the bale on the sides of the box also aids in resisting the downward pressure, and, as before intimated, this friction can be nicely adjusted by means of the springs and bolts acting on the adjustable side so as to get the desired resistance to the downward movement of the lower plate. It will thus be seen that the bale is made up by delivering a continuous condensed bat into the box and forcing the delivered portion of the bale downward under pressure against the frictional resistance until the bale has been completed. When this is done, the platen D is raised, another plate is inserted, and by means of the lever and toggles this plate is forced downward, passing the hooks until it is in operative position, it being understood that the hooks prevent the upward movement of the plates while a fresh one is being inserted. As this fresh plate is forced downward the bat will lap around the edge of the plate adjacent to the rollers, which edge may be reduced in thickness, or practically to a knife-edge, if desired, so as to offer the least obstruction to the continuous feeding of the material and serve practically as a separator of the material being delivered between the completed bale and the commencement of a new bale, and the material for the new bale is then delivered above the fresh plate, thus allowing of continuous operation of the compressing-rollers and avoiding the necessity of stopping the delivery of the condensed bat. The material around the edge of the plate can be severed previous to tying the bale. As the second bale is being built up the first bale is forced downward into tying position while under pressure, and the operators can pass the bands K through the grooves $c$ of the plates and properly secure them by ties $k$. It is evident that when it is desired to use baling-cloth properly-shaped strips can be placed between the plates receiving the cotton, and they can be secured in the usual manner. As the baling proceeds the tied bale is delivered beneath the press and the operations continue in the manner above indicated.

It will be seen that the compressed and condensed bat is delivered continuously into the bale-box above a plate which acts practically as an abutment for the lower end of the bale and that this abutment is forced downward by the pressure of the accumulated cotton in the box, the upward pressure of the cotton being resisted by the platen D or by the upper plate C².

While I have shown the bale-box as rectangular in shape and this is the preferred shape, it is evident that it can be made in other shapes as desired, and the same general principles of the invention can thus be utilized in different ways. It will also be observed that the bat is thoroughly condensed before it is delivered and forced into the bale-box, and in this way I am enabled to produce a bale of great density and to band or tie it while under pressure, and the operations are continuous. The lower plate forms what may be termed a "moving abutment" for the bale, the resistance of which is controlled by the friction devices on the abutment acting on the bale as it is being formed.

What I claim is—

1. In a baling-press, the combination with a bale-box, of an abutment stationary at one end of the box, and a movable abutment, one side of the box being adjustable and under spring-pressure for controlling the movements of the movable abutment and the bale by friction between the adjustable spring-pressed side of the box and the movable abutment and bale, substantially as described.

2. In a continuously-operating baling-press, the combination with a bale-box, of separating-plates, means for continuously delivering material between the plates in the box, and means for successively forcing the plates down upon the top of the completed bale into position to separate the bales, substantially as described.

3. The combination with a baling-press having an open end adapted to receive a lower and an upper separating-plate between which the material is to be pressed, of means for engaging and locking said upper plate in the box, and means for forcing another plate into position above said upper plate, substantially as described.

4. The combination with a baling-press having an open end adapted to receive a lower and an upper separating-plate between which the material is to be pressed, of means for holding said upper plate against displacement, a platen, and means for operating the same for forcing another plate into the box, substantially as described.

5 In a continuously-operating baling-press, the combination with a bale-box, of a separating-plate, one edge of the plate being reduced in thickness for the purpose stated, substantially as described.

6. In a continuously-operating baling-press, the combination with a bale-box, of two plates, one fixedly held in the box, and one forming a movable abutment, and between which plates the material is delivered, means for holding one of the plates in the box, means for forcing another plate on top of said held plate, and means for forcibly delivering the material between the plates, substantially as described.

7. In a continuously-operating baling-press, the combination with a bale-box, of two plates, one held fixedly in the box and the other forming a movable abutment in the box and between which plates the material is delivered, and means for continuously delivering the material between the plates, substantially as described.

8. In a baling-press, the combination with a box, of a stationary abutment, a movable abutment, means for forcing the material to be pressed between the abutments and means for causing a certain amount of resistance to the movable abutment, substantially as described.

9. In a compress, the combination with a box, of rollers for forcing the material to be pressed into the box, means for inserting a plate to separate the material into bales and means for offering resistance to the movement of the bale being discharged, substantially as described.

10. In a continuously-operating baling-press, the combination with a box, of means for forcing cotton or other material to be pressed into the box, means for inserting a plate to separate the material into bales and means for offering certain resistance to the movement of the bale being discharged, substantially as described.

11. In a continuously-operating press, the combination with a box or chamber, of means for inserting a separating-plate means for forcing cotton into the box behind the separating-plate and means for offering the necessary resistance to the movement of the bale being discharged, substantia ly as descr bed.

12. In a continuously-operating press, the combination with a box or chamber, of means for inserting a separating-plate means for forcing cotton into the box behind the separating-plate with means whereby the bale can be banded during the operation, substantially as described.

13. In a continuously-operating baling-press, the combination with the bale-box, of two plates, one forming a movable abutment and the other forming a fixed abutment, and between which the material is delivered, of compressing-rollers for progressively condensing the material and continuously delivering it to the box between the plates, substantially as described.

14. In a continuously-operating baling-press, the combination with a bale-box, of two plates within the box, one forming a movable abutment and the other a stationary abutment, and between which the material is delivered, and means for forcing the stationary abutment into position to act as a movable abutment and introducing another plate to act as a stationary abutment, substantially as described.

In testimony whereof I have signed my name to this specification in the presence of two subscribing witnesses.

SAMUEL J. WEBB.

Witnesses:
F. L. FREEMAN,
W. C. DUVALL.